April 22, 1952     H. S. ALEXANDER     2,593,826
STEREOSCOPIC ROTATOR FOR ROTATING STEREOSCOPIC PICTURES
Filed Nov. 16, 1949
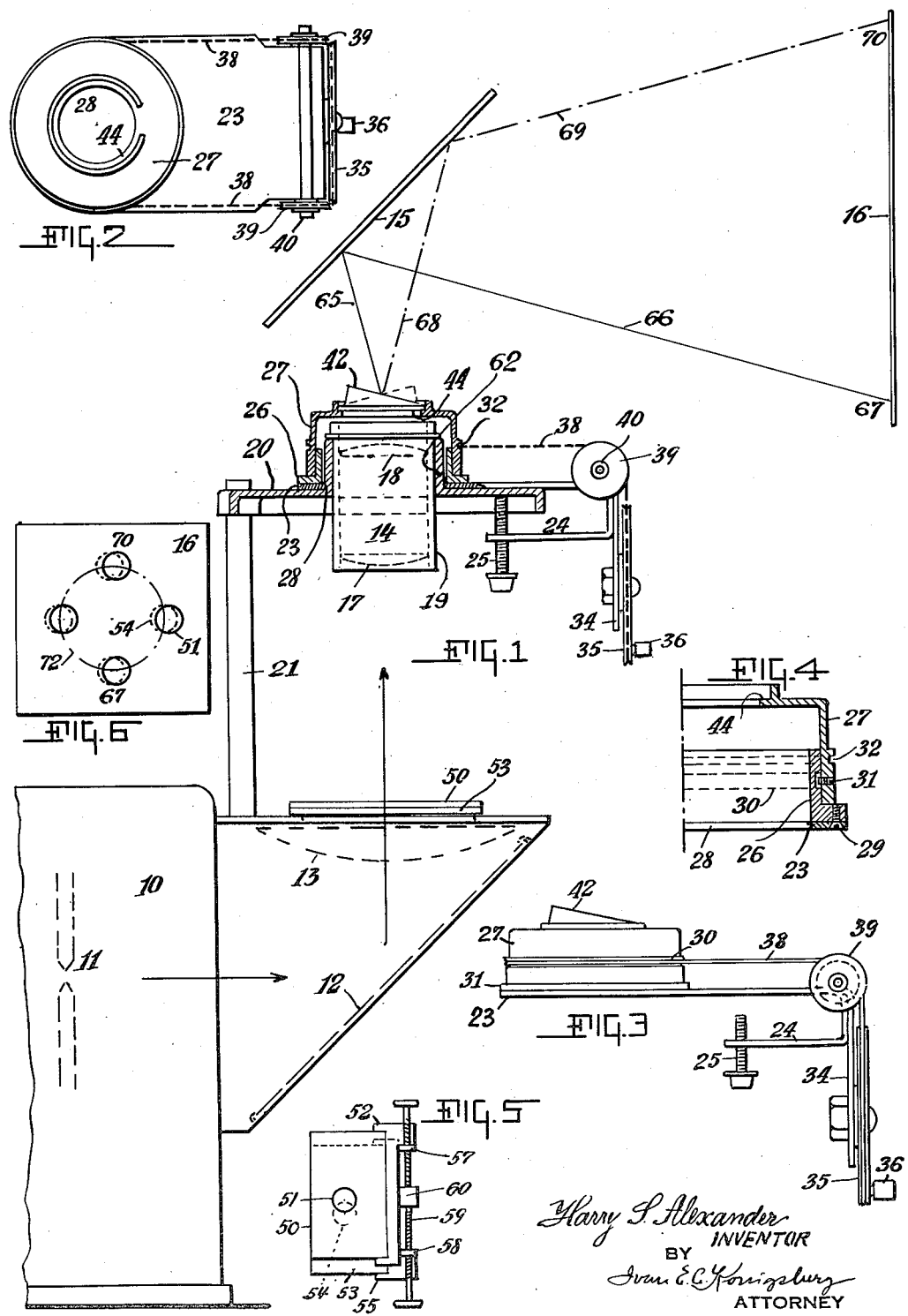
Harry S. Alexander
INVENTOR
BY
Ivan E. C. Konigsberg
ATTORNEY Patented Apr. 22, 1952

2,593,826

UNITED STATES PATENT OFFICE 2,593,826

STEREOSCOPIC ROTATOR FOR ROTATING STEREOSCOPIC PICTURES

Harry S. Alexander, Meadville, Pa., assignor to Keystone View Company, Meadville, Pa., a corporation of Pennsylvania Application November 16, 1949, Serial No. 127,687

1 Claim. (Cl. 128—76.5)

The object of this invention is to provide a new method and a new apparatus for moving a stereoscopic target in the plane in which it is presented and viewed. In the field of binocular vision training and techniques transparent stereoscopic slides are used and operated to form an optically movable stereoscopic complement with relation to a fixed target representation. Such slides are also used to cause a portion of a stereoscopic picture to advance or recede optically with relation to another portion of the same picture along the line of view. Such training usually has reference to the sense of depth perception. Slides for these purposes, their function and operation are disclosed in my pending application for improvements in transparent slides for binocular vision training, executed November 3, 1949, filed November 16, 1949, with Serial Number 127,688.

By the new method a stereoscopic picture may be formed and presented for viewing and thereafter the picture may be moved in its own plane of presentation. The movement may be rotary, continuous or interrupted as the case may require. The new method and apparatus opens up a large field of clinical possibilities in the art of binocular vision training. For example, when a stereoscopic picture is moved optically in a plane across the line of view of a patient he may not be able to spot the varying positions of the picture as it is moved in its own plane, although he is able to observe the picture as parts thereof are optically advanced or moved away from him in space. In such case, therefore, it may be judged that the patient has lost his sense of stereopsis or sense of depth perception of objects moving across his field of view.

Such defective vision may be important in determining the patient's ability to drive an automobile or engage in other occupations or pursuits where the sense of depth perception in all its phases is important.

One object of the invention is to provide a stereoscopic rotator in the form of an attachment adapted to be mounted upon a projection apparatus for use in carrying out the objects of the invention, i. e. the optical movement of a stereoscopic target in its plane of presentation for view. The attachment includes means for securing it upon the projection apparatus in any desirable operative relation. A prism is supported by the attachment and means are provided for rotating the prism to carry out the movements of the stereoscopic target. In the drawing illustrating the invention.

Fig. 1 is a view showing the stereoscopic rotator in operative position upon a projection apparatus, parts being in section and parts in outline and broken away.

Fig. 2 is a plan view of the stereoscopic rotator.

Fig. 3 is a side view thereof.

Fig. 4 is a half-sectional view of details of the prism support or holder.

Fig. 5 is an outline view of a pair of slides and mechanism for operating the same to form a stereoscopic target.

Fig. 6 is a diagram illustrating the operation of the stereoscopic rotator. The latter term is selected for reference in describing the invention.

Fig. 1 illustrates an optical projection apparatus comprising a housing 10 having a source of light at 11. The light beam is directed towards an inclined reflecting mirror 12 which reflects the beam upwards through a suitable lens 13, through an objective lens assembly 14, towards a second reflecting mirror 15 which in turn reflects the light upon a screen 16. The objective lens assembly may consist of lenses 17, 18. Its housing 19 is supported in a hub 62 of a stage 20 which extends to one side of an upright support 21.

The stereoscopic rotator comprises a base plate 23 with a bracket 24 bearing a screw 25 whereby the attachment may be attached to the stage 20 as shown in Fig. 1. The base carries a fixed tubular bearing 26 upon which is rotatably mounted a tubular prism holder 27. As best seen in Fig. 4, the bearing 26 is secured upon the base by means of screws as at 29 and is provided with an annular groove 30. The prism holder 27 has a set screw 31 which engages the groove to prevent axial displacement as will be understood. The holder has a belt groove 32.

The base 23 has an opening which fits around the aforesaid hub 62 of the stage 20. The base has a depending leg 34 upon which is mounted a driving pulley 35 with an operating handle 36. A belt 38 passes around the pulley 35, over two idlers 39, 39 and around the prism holder 27 in its belt groove 30. The idlers 39 are grooved disks, one on each side of the base 23 and rotate freely upon shafts 40 secured to the base. The prism holder supports a suitable prism 42 upon a circular ledge 44, Fig. 4. The belt 38 is preferably a fine coiled spring. It is indicated in Figs. 1 and 2 by a heavy dotted line.

Fig. 5 shows a pair of transparent stereoscopic slides. The top slide 50 may bear the picture of a ring 51 in red color. The slide is carried in a slide holder 52. The second slide 53 may bear the picture of another ring 54 in green color and is carried in a second slide holder 55. The holders have threaded bearings 57, 58 engaged by a right and left threaded shaft 59 secured in a fixed bearing 60 on a base, not shown. By rotating the shaft, the slides are moved an equal distance in opposite directions and when viewed through red and green spectacles, the one ring will advance optically, while the other ring recedes, depending upon the directions of the transverse movements. The slides with their operating means are placed upon the projection apparatus below the objective lens assembly. In Fig. 1 only the slides are shown.

The stereoscopic rotator may be operated by a technician seated on the near side of the projection apparatus. He may then operate the driving pulley with the right hand. Or he may take his place on the far side of the apparatus and turn the driving pulley with his left hand. In either position he is able to observe the functions of the apparatus and the patient and with his free hand operate the slides. It will also be apparent that the rotator may be mounted upon the projection apparatus extending therefrom in any desired direction or with the base 23 across the line of view with the driving pulley on either the right or the left side for convenient operation in the home by either a right handed or a left handed person.

The rotator is attached by placing the prism holder 26—27 in position as in Fig. 1 upon the stage 20 over and around the hub 62 and then tightening the screw 25. A reverse movement will cause the stereoscopic rotator to be detached.

In use, the slides 50 and 53 are operated to form a stereoscopic picture which appears upon the screen 16 and parts of the picture are then caused optically to move along the line of view for training in depth perception. With the prism 42 in one position as shown in full lines in Fig. 1, the path of the center ray of light through the prism is shown in the lines 65, 66, the image appearing upon the screen at 67. When the prism is reversed as shown in dotted lines, the ray of light will be through the prism and thence to the screen as indicated by the lines 68, 69, the image appearing upon the screen at 70. The positions of the image at 67 and 70 are shown in Fig. 6 as they appear upon the screen 16 with the red ring 51 in front of the green ring 54 or vice versa as the case may be. If now the prism is rotated by operating the driving pulley 35, the figures of the rings or other pictorial representation will move optically in a circle as at 72 in Fig. 6. Hence the stereoscopic rotator may be used to move the stereoscopic image in a plane normal to the optical axis of the objective 17—18, either in a continuous movement or stepwise in either clockwise or counterclockwise direction. Or the operation may be characterized by stating that the stereoscopic target or picture or images may be optically moved in a plane across the line of view or in its or their own plane of representation. While this rotating operation is being carried out, the stereoscopic representations may be moved optically along the line of view.

The projected image is not turned upside down or otherwise distorted by the rotating movement as would be the case were the slides themselves rotated. A characteristic treatment of a patient will start with a prism having a small diameter of rotation and will work up to the use of prisms with larger diameters of rotation as the patient responds to the treatment.

Neither the projection apparatus, nor the stereoscopic rotator in the precise forms disclosed are necessarily the only embodiments of the invention which is susceptible of changes and modifications within the scope of the appended claim.

I claim:

A unitary stereoscopic image rotator attachment of the character described comprising a base having a view opening, a circular bearing on top of the base surrounding said view opening, a prism carrier rotatably mounted upon said circular bearing, said prism carrier having a circular groove, a deviating prism mounted in said prism carrier in optical alinement with said view opening, said base having bracket means extending to one side of said view opening, mechanism in said bracket means for rotating said prism carrier comprising a grooved hand wheel, an operating cable extending from said wheel to the said circular groove in the prism carrier, a knob for rotating said hand wheel and a screw carried by said bracket means for detachably securing the said rotator to an optical projection apparatus with said view opening and prism in optical operative alinement with the projection axis of said apparatus.

HARRY S. ALEXANDER.

REFERENCES CITED

The following references are of record in the file of this patent:

UNITED STATES PATENTS

| Number | Name | Date |
| --- | --- | --- |
| 2,012,169 | Jones | Aug. 20, 1935 |
| 2,377,476 | Berglund | June 5, 1945 |
| 2,389,087 | Schubert | Nov. 13, 1945 |

FOREIGN PATENTS

| Number | Country | Date |
| --- | --- | --- |
| 338,962 | Great Britain | Dec. 1, 1930 |